United States Patent [19]
Bottoms

[11] 3,783,905
[45] Jan. 8, 1974

[54] HYDRAULIC ACCUMULATOR
[75] Inventor: Harry Simister Bottoms, Warwickshire, England
[73] Assignee: Joseph Lucas Industries Ltd., Birmingham, England
[22] Filed: Oct. 5, 1971
[21] Appl. No.: 186,723

[30] Foreign Application Priority Data
Oct. 8, 1970 Great Britain.................. 47,832/70

[52] U.S. Cl. ................................................ 138/30
[51] Int. Cl. ............................................. F16l 55/04
[58] Field of Search ................................. 138/30, 31

[56] References Cited
UNITED STATES PATENTS
2,365,994  12/1944  Ashton................................ 138/31
2,383,180  8/1945  Ellinwood........................ 138/30 X
3,224,345  12/1965  Doetsch............................ 132/30 X FOREIGN PATENTS OR APPLICATIONS
985,370  3/1951  France................................ 138/31

Primary Examiner—Herbert F. Ross
Attorney—Holman & Stern

[57] ABSTRACT

A hydraulic accumulator has a chamber divided into compartments by a slidable member and a bellows. The bellows is provided at its outer and inner edges with axially extending portions which nest together when the bellows is compressed by discharge of hydraulic fluid from one of the compartments, whereby relative lateral movement of the bellows segments is prevented.

10 Claims, 2 Drawing Figures

HYDRAULIC ACCUMULATOR

BACKGROUND OF THE INVENTION

This invention relates to hydraulic accumulators and has as an object to provide a hydraulic accumulator in a convenient form.

SUMMARY OF THE INVENTION

According to the invention a hydraulic accumulator comprises a chamber, a member slidable within the chamber and defining two compartments within the chamber, a connection to one of the compartments for a hydraulic fluid, means for introducing a gas under pressure into the other of the compartments, and a generally frusto-conical bellows connected both to the chamber wall and to the slidable member to provide a seal therebetween, the bellows having at each of its inner and outer edges an axially-extending portion and the arrangement being such that the bellows is compressed by discharge of the hydraulic fluid, and that in the absence of a hydraulic fluid pressure adjacent faces of the bellows are in contact and the said axially extending portions nest together.

An example of a hydraulic accumulator according to the invention will now be described with reference to the accompanying drawings in which:

DETAILED DESCRIPTION OF THE DRAWINGS

Figure 1:
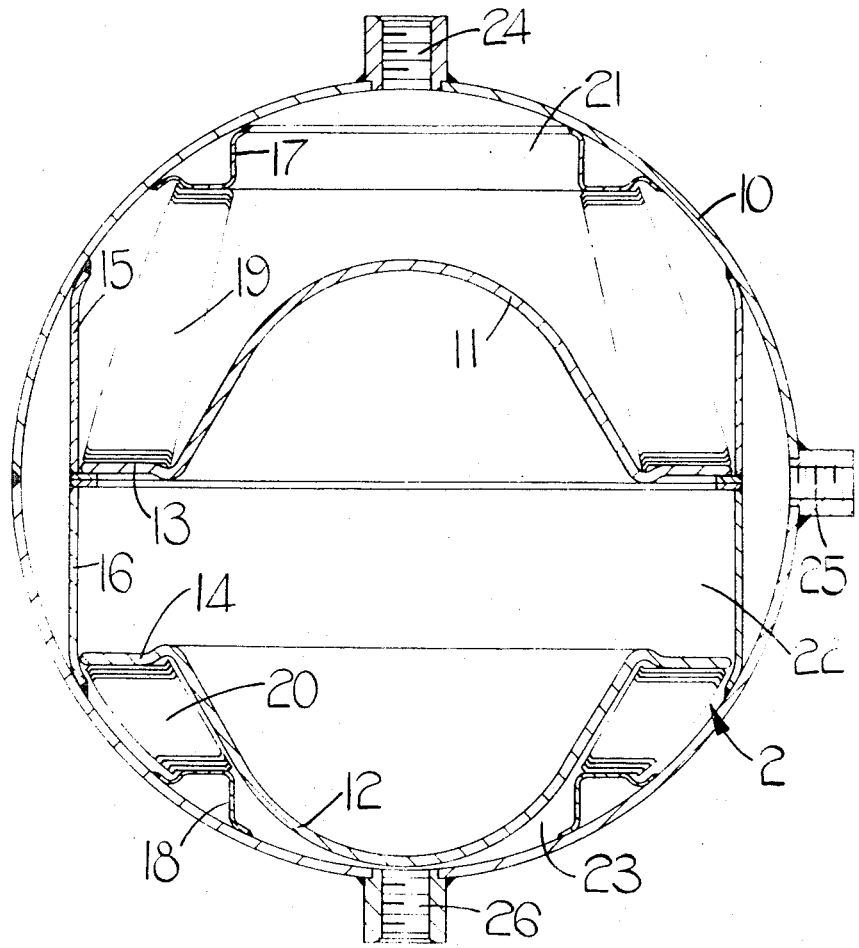
FIG. 1 is a view in section through an accumulator.

A hydraulic accumulator has a generally spherical body 10 within which are slidable a pair of domed members 11, 12 respectively formed with flanges 13, 14. The body 10 includes cylindrical guide portions 15, 16 for the respective members 11, 12 and also includes annular brackets 17, 18. A pair of resilient metal bellows units 19, 20 are respectively sealingly engaged between the flange 13 and bracket 17 and between the flange 14 and bracket 18, so as to define compartments 21, 22, 23 within the spherical body 10. Connections 24, 25, 26 extend through the wall of the body 10 into the respective compartments 21, 22, 23.

Figure 2:
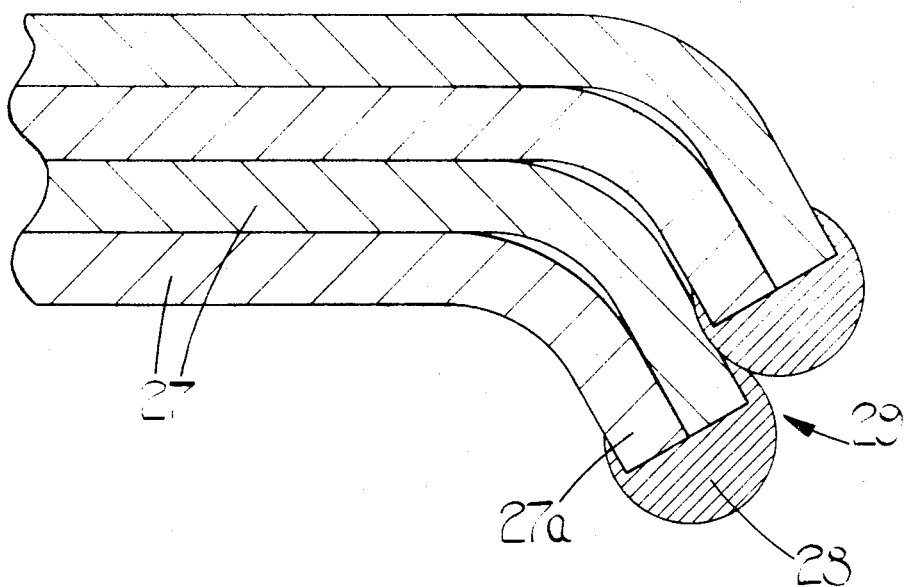
FIG. 2 is a fragmentary view in section, to an enlarged scale, of part of a bellows in FIG. 1.

The bellows units 19, 20 are of generally frustoconical form with, the width of the axially facing walls of the bellows being less at one end than at the other. The bellows units are formed from a number of discs which have their inner and outer edges respectively welded to the corresponding edges of the discs on either side. FIG. 2 shows a section through a part of the bellows indicated generally at arrow 2 in FIG. 1. Each disc 27 in a bellows unit has a different form and has its inner edge 27a and its outer edge turned over in opposite directions. A bead of weld 28 is formed at the joint of the discs 27 and combines with the edges adjacent the joint to provide an axially extending portion 29. The bellows units 19, 20 are so formed that, when the bellows units are fully compressed, the adjacent edges of the discs 27 are in contact and the portions 29 at the inner and outer edges of the discs nest together as shown to prevent relative lateral movement of the discs.

In use, compartments 21, 23 are charged with hydraulic fluid which is retained therein by external valve means (not shown). Compartment 22 is charged with a suitable gas under pressure, for example carbon dioxide, which is also retained by valve means (not shown). The accumulator is subsequently connected to an external apparatus to which hydraulic power is to be supplied one or both of the connections 24, 26 communicating with the apparatus.

If hydraulic fluid is discharged from compartment 23 the member 12 is urged by gas pressure to the position shown. In this position there exists a considerable pressure difference across the bellows 20. Since, however, the discs 27 of the bellows 20 are in contact, as shown in FIG. 2, and the ends of the bellows 20 are supported by the flange 14 and bracket 18, the discs 27 will not be deformed and may therefore be made of relatively thin material. The nesting of the internal and external axially extending portions 29, as above described, prevents deformation due to relative lateral movement of the discs 27.

Bellows 19 behaves in a like manner when compartment 21 is discharged. If it is required that compartments 21, 23 should be sequentially discharged it may be arranged that whichever of the compartments is the last to be discharged has a larger volume than the other, since the gas pressure will have been reduced during the first operation. The increased volume of the larger compartment will ensure that a substantially equal amount of work is delivered to an external apparatus by both compartments.

I claim:

1. A hydraulic accumulator comprising a chamber, a member slidable within the chamber and defining two compartments within the chamber, a connection to one of the compartments for a hydraulic fluid, means for introducing a gas under pressure into the other of the compartments, and a generally frustoconical bellows connected both to the chamber wall and to the slidable member to provide a seal therebetween, the bellows having at each of its inner and outer edges, an axially extending portion and the arrangement being such that the bellows is compressed by discharge of the hydraulic fluid, and that in the absence of a hydraulic fluid pressure, adjacent faces of the bellows are in contact and said axially extending portions nest together.

2. The accumulator as claimed in claim 1 in which the chamber is generally spherical.

3. The accumulator as claimed in claim 2 in which the slidable member is domed so that when the bellows is compressed, said member lies close to the chamber wall.

4. The accumulator as claimed in claim 1 which includes a guide within the chamber for the member.

5. The accumulator as claimed in claim 1 in which the bellows comprises a plurality of discs each of which is joined at its inner and outer edges respectively to discs on either side.

6. The accumulator as claimed in claim 5 in which the discs are joined by welding.

7. The accumulator as claimed in claim 6 in which said axially extending portions comprise turned-over edges on said discs and beads formed by welding.

8. The accumulator as claimed in claim 7 in which the outer and inner edges of said discs are turned over in opposite directions.

9. The accumulator as claimed in claim 1 which includes a further member slidable in the chamber to define a third compartment therein, a connection to said third compartment for a hydraulic fluid, said third compartment lying on a side of said other compartment remote from said one compartment, and a further frustoconical bellows, similar to the first mentioned bellows, said further bellows, sealingly interconnecting said further slidable member and said chamber wall.

10. The accumulator as claimed in claim 9 in which said third compartment is larger than said one compartment.

* * * * *